United States Patent
Hunt et al.

(10) Patent No.: US 9,891,939 B2
(45) Date of Patent: Feb. 13, 2018

(54) APPLICATION COMPATIBILITY WITH LIBRARY OPERATING SYSTEMS

(75) Inventors: Galen C. Hunt, Bellevue, WA (US);
Reuben R. Olinsky, Seattle, WA (US);
Michael R. Fortin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/314,512

(22) Filed: Dec. 8, 2011

(65) Prior Publication Data

US 2012/0227061 A1 Sep. 6, 2012

Related U.S. Application Data

(60) Provisional application No. 61/449,072, filed on Mar. 3, 2011.

(51) Int. Cl.
*G06F 9/45* (2006.01)
*G06F 9/455* (2006.01)
*G06F 9/44* (2006.01)

(52) U.S. Cl.
CPC ............ *G06F 9/45558* (2013.01); *G06F 8/71* (2013.01); *G06F 2009/45575* (2013.01)

(58) Field of Classification Search
USPC .......................................................... 719/331
See application file for complete search history.

(56) References Cited

U.S. PATENT DOCUMENTS

| | | | |
|---|---|---|---|
| 7,287,259 B2 | 10/2007 | Grier et al. | |
| 7,685,593 B2 | 3/2010 | Solomon et al. | |
| 7,703,083 B2 | 4/2010 | Shi et al. | |
| 2002/0019972 A1 | 2/2002 | Grier et al. | |
| 2006/0161563 A1* | 7/2006 | Besbris et al. | ................. 707/100 |
| 2006/0184931 A1* | 8/2006 | Rochette et al. | ............. 717/169 |
| 2007/0283324 A1 | 12/2007 | Geisinger | |
| 2008/0222160 A1* | 9/2008 | MacDonald et al. | ........... 707/10 |
| 2008/0263531 A1 | 10/2008 | Perry et al. | |
| 2009/0282404 A1 | 11/2009 | Khandekar et al. | |
| 2010/0306270 A1* | 12/2010 | McDiarmid | .............. G06F 8/61 707/796 |

(Continued)

FOREIGN PATENT DOCUMENTS

| | | |
|---|---|---|
| CN | 101655798 A | 2/2010 |
| JP | 2006164287 A | 6/2006 |

OTHER PUBLICATIONS

"International Search Report", dated Oct. 30, 2012, Application No. PCT/US2012/027635, Filed Date: Mar. 3, 2012, pp. 9.

(Continued)

*Primary Examiner* — Andy Ho
*Assistant Examiner* — Abdou Seye
(74) *Attorney, Agent, or Firm* — Davin Chin; Chin IP, PLLC

(57) ABSTRACT

Application compatibility is facilitated by use of library operating systems. Library operating systems can encapsulate portions of an application likely to break application compatibility. An application can be bound to a compatible library operating system that operates over a host operating system. Furthermore, library operating system version can be greater than, equal, or less than the version of the host operating system. Consequently, both backward and forward compatibility is enabled.

20 Claims, 6 Drawing Sheets

(56) References Cited

U.S. PATENT DOCUMENTS

2011/0191494 A1     8/2011   Turanyi et al.
2012/0222025 A1*   8/2012   Pandit ........................... 717/170

OTHER PUBLICATIONS

Engler, et al., "Exokernel: An Operating System Architecture for Application-Level Resource Management", Retrieved at <<pdos.csail.mit.edu/6.828/2008/readings/engler95exokernel.pdf>>, ACM SIGOPS Operating Systems Review, vol. 29, Issue 5, Dec. 3, 1995, pp. 251-266.
Fischer, Donald, "Red Hat Enterprise Linux 4 Application Compatibility", Retrieved at <<http://www.redhat.com/f/pdf/rhel4/AppCompat.pdf>>, Feb. 2005, pp. 1-12.
Allen, Jennifer, "Windows Vista Application Development Requirements for User Account Control Compatibility", Retrieved at <<http://msdn.microsoft.com/en-us/library/bb530410.aspx>>, Retrieved Date: Sep. 20, 2011, pp. 59.
"Amazon Elastic Compute Cloud (EC2)", Retrieved at <<http://aws.amazon.com/ec2/>>, 2006, pp. 22.
Ammons, et al., "Libra: A Library Operating System for a JVM in a Virtualized Execution Environment", Retrieved at <<http://citeseerx.ist.psu.edu/viewdoc/download?doi=10.1.1.152.4632&rep=rep1&type=pdf>>, International Conference on Virtual Execution Environments (Co-Located with FCRC 2007 Conference), Jun. 13-15, 2007, pp. 11.
Anderson, Thomas E., "The Case for Application-Specific Operating Systems", Retrieved at <<http://ieeexplore.ieee.org/stamp/stamp.jsp?tp=&arnumber=275682>>, Third Workshop on Workstation Operating Systems, Apr. 23-24, 1992, pp. 92-93.
Appavoo, et al., "Providing a Linux API on the Scalable K42 Kernel", Retrieved at <<http://citeseerx.ist.psu.edu/viewdoc/download;jsessionid=152BE75DCC39E4C7F0C92245173F2A3F?doi=10.1.1.9.1395&rep=rep1&type=pdf>>, Proceedings of the FREENIX Track: USENIX Annual Technical Conference, Jun. 9-14, 2003, pp. 14.
Barham, et al., "Xen and the Art of Virtualization", Retrieved at <<http://www.cl.cam.ac.uk/research/srg/netos/papers/2003-xensosp.pdf>>, Proceedings of the nineteenth ACM symposium on Operating systems principles, Oct. 19-22, 2003, pp. 14.
Baumann, et al., "The Multikernel: A New OS Architecture for Scalable Multicore Systems", Retrieved at <<http://www.sigops.org/sosp/sosp09/papers/baumann-sosp09.pdf>>, Proceedings of the ACM SIGOPS 22nd symposium on Operating systems principles, Oct. 11-14, 2009, pp. 1-20.
Bhattiprolu, et al., "Virtual Servers and Checkpoint/Restart in Mainstream Linux", Retrieved at <<http://lxc.sourceforge.net/doc/sigops/appcr.pdf>>, ACM SIGOPS Operating Systems Review—Research and developments in the Linux kernel, vol. 42, No. 5, Jul. 2008, pp. 104-113.
Bugnion, et al., "Disco: Running Commodity Operating Systems on Scalable Multiprocessors", Retrieved at <<http://citeseerx.ist.psu.edu/viewdoc/download?doi=10.1.1.157.8827&rep=rep1&type=pdf>>, ACM Transactions on Computer Systems, vol. 15, No. 4, Nov. 1997, pp. 412-447.
Chen, et al., "Setuid Demystified", Retrieved at <<http://www.cs.berkeley.edu/~daw/papers/setuid-usenix02.pdf>>, in Proceedings of the 11th USENIX Security Symposium, USENIX Association, 2002, pp. 20.
Cheriton, et al., "A Caching Model of Operating System Kernel Functionality", Retrieved at <<http://citeseerx.ist.psu.edu/viewdoc/download?doi=10.1.1.129.5864&rep=rep1&type=pdf>>, in Proceedings of the 1st USENIX Symposium on Operating Systems Design and Implementation, Nov. 1994, pp. 15.
Douceur, et al., "Leveraging Legacy Code to Deploy Desktop Applications on the Web", Retrieved at <<http://classes.soe.ucsc.edu/cmps223/Spring09/Douceur%2008.pdf>>, Proceedings of the 8th USENIX conference on Operating systems design and implementation, 2008, pp. 16.

Eiraku, et al., "Fast Networking with Socket-Outsourcing in Hosted Virtual Machine Environments", Retrieved at <<http://citeseerx.ist.psu.edu/viewdoc/download?doi=10.1.1.155.875&rep=rep1&type=pdf>>, Proceedings of the 2009 ACM Symposium on Applied Computing (SAC), Mar. 9-12, 2009, pp. 8.
Engler, et al., "Exokernel: An Operating System Architecture for Application-Level Resource Management", Retrieved at <<http://citeseerx.ist.psu.edu/viewdoc/download?doi=10.1.1.52.2893&rep=rep1&type=pdf>>, Proceedings of the fifteenth ACM symposium on Operating systems principles, Dec. 3-6, 1995, pp. 1-17.
Franke, et al., "Fuss, Futexes and Furwocks: Fast Userlevel Locking in Linux", Retrieved at <<http://kernel.org/doc/ols/2002/ols2002-pages-479-495.pdf>>, in Proceedings of the Ottawa Linux Symposium, 2002, pp. 479-497.
Garfinkel, Tal., "Traps and Pitfalls: Practical Problems in System Call Interposition based Security Tools", Retrieved at <<http://www.stanford.edu/~talg/papers/traps/traps-ndss03.pdf>>, in Proceedings of the Network and Distributed Systems Security Symposium, 2003, pp. 14.
Malan, et al., "DOS as a Mach 3.0 Application", Retrieved at <<http://www.usenix.org/publications/library/proceedings/mach91/malan.pdf>>, Proceedings of the Usenix Mach Symposium, Nov. 1991, pp. 27-40.
Gupta, et al., "Difference Engine: Harnessing Memory Redundancy in Virtual Machines", Retrieved at <<http://cseweb.ucsd.edu/~vahdat/papers/osdi08-de.pdf>>, in Proceedings of the 8th USENIX Symposium on Operating Systems Design and Implementation, 2008, pp. 14.
Helander, Johannes., "Unix under Mach: The LITES Server", Retrieved at <<http://research.microsoft.com/pubs/146893/10.1.1.49.5448.pdf>>, Helsinki University of Technology, 1994, pp. 71.
Howell, et al., "Living Dangerously: A Survey of Software Download Practices", Retrieved at <<http://research.microsoft.com/pubs/131156/vmsurvey2.pdf>>, MSR-TR-2010-51, Microsoft Research, 2010, pp. 16.
"Escaping from Microsoft's Protected Mode Internet Explorer—Evaluating a Potential Security Boundary", Retrieved at <<http://www.verizonbusiness.com/resources/whitepapers/wp_escapingmicrosoftprotectedmodeinternetexplorer_en_xg.pdf>>, White Paper, 2010, pp. 8.
Leslie, et al., "The Design and Implementation of an Operating System to Support Distributed Multimedia Applications", Retrieved at <<http://ieeexplore.ieee.org/stamp/stamp.jsp?tp=&arnumber=536480>>, IEEE Journal on Selected Areas in Communications, vol. 14, No. 7, Sep. 1996, pp. 1280-1297.
Litzkow, et al., "Checkpoint and Migration of UNIX Processes in the Condor Distributed Processing System", Retrieved at <<http://research.cs.wisc.edu/techreports/1997/TR1346.pdf>>, Technical Report 1346, Apr. 1997, pp. 9.
Loscocco, et al., "Integrating Flexible Support for Security Policies into the Linux Operating System", Retrieved at <<http://www.nsa.gov/research/_files/publications/security_policies_linux_os.pdf>>, Proceedings of the FREENIX Track: 2001 USENIX Annual Technical Conference, Jun. 25-30, 2001, pp. 1-62.
Love, Robert., "Get on the D-BUS", Retrieved at <<http://www.ee.ryerson.ca/~courses/coe518/LinuxJournal/e1j2005-130-D-BUS.pdf>>, Linux Journal, 2005, pp. 5.
"Internet Information Services 7.5", Retrieved at <<http://technet.microsoft.com/en-us/library/dd364124(WS.10).aspx>>, Mar. 24, 2009, pp. 4.
"Microsoft Application Virtualization (App-V)", Retrieved at <<http://www.microsoft.com/en-us/windows/enterprise/products-and-technologies/virtualization/app-v.aspx>>, 2006, pp. 2.
"Performance Tuning Guidelines for Windows Server 2008 R2", Retrieved at <<http://download.microsoft.com/download/8/F/9/8F9CB30B-1617-4CF8-8534-9C2AAA0117F4/Perf-tun-srv-R2.docx>>, Feb. 28, 2011, pp. 119.
"Remote Desktop Protocol: Basic Connectivity and Graphics Remoting Specification", Retrieved at <<http://download.microsoft.com/download/9/5/E/95EF66AF-9026-4BB0-A41D-A4F81802D92C/[MS-RDPBCGR].pdf>>, 2010, pp. 1-421.

(56) References Cited

OTHER PUBLICATIONS

Tucker, et al., "Solaris Zones: Operating System Support for Server Consolidation", Retrieved at <<http://www.usenix.org/event/vm04/wips/tucker.pdf>>, Proceedings of the 3rd Virtual Machine Research and Technology Symposium, May 6-7, 2004, pp. 2.
Roscoe, et al., "Hype and Virtue", Retrieved at <<http://people.inf.ethz.ch/troscoe/pubs/hotos07-hype.pdf>>, Proceedings of the 11th USENIX workshop on Hot topics in operating systems, 2007, pp. 6.
Sapuntzakis, et al., "Virtual Appliances for Deploying and Maintaining Software", Retrieved at <<http://suif.stanford.edu/papers/lisa03-deploying-vap.pdf>>, Proceedings of the 17th Conference on Systems Administration (LISA), Oct. 26-31, 2003, pp. 15.
Soltesz, et al., "Container-based Operating System Virtualization: A Scalable, High-Performance Alternative to Hypervisors", Retrieved at http://nsg.cs.princeton.edu/publication/vserver_eurosys_07.pdf>>, Proceedings of the 2nd ACM SIGOPS/EuroSys European Conference on Computer Systems, Mar. 21-23, 2007, pp. 13.
Spear, et al., "Solving the Starting Problem: Device Drivers as Self-Describing Artifacts", Retrieved at <<http://www.cs.kuleuven.ac.be/conference/EuroSys2006/papers/p45-spear.pdf>>, Proceedings of the 1st ACM SIGOPS/EuroSys European Conference on Computer Systems, Apr. 18-21, 2006, pp. 45-58.
Sugerman, et al., "Virtualizing I/O Devices on VMware Workstation's Hosted Virtual Machine Monitor", Retrieved at <<http://www.usenix.net/publications/library/proceedings/usenix01/sugerman/sugerman.ps>>, Proceedings of the General Track: 2002 USENIX Annual Technical Conference, 2001, pp. 14.
Charles., "Mark Russinovich: Inside Windows 7", Retrieved at <<http://channel9.msdn.com/Shows/Going+Deep/Mark-Russinovich-Inside-Windows-7>>, Jan. 14, 2009, pp. 12.
"VMWare ThinApp.", Retrieved at <<http://www.vmware.com/files/pdf/VMware-ThinApp-DS-EN.pdf>>, 2008, pp. 2.
Waldspurger, Carl A., "Memory Resource Management in VMware ESX Server", Retrieved at <<http://www.waldspurger.org/carl/papers/esx-mem-osdi02.pdf>>, ACM SIGOPS Operating Systems Review—OSDI '02: Proceedings of the 5th symposium on Operating systems design and implementation, vol. 36, No. SI, Dec. 2002, pp. 1-14.
Whitaker, et al., "Scale and Performance in the Denali Isolation Kernel", Retrieved at <<http://citeseerx.ist.psu.edu/viewdoc/download?doi=10.1.1.126.4917&rep=rep1&type=pdf>>, Proceedings of the 5th Symposium on Operating Systems Design and Implementation, Dec. 9-11, 2002, pp. 16.
Yee, et al., "Native Client: A Sandbox for Portable, Untrusted x86 Native Code", Retrieved at <<http://static.googleusercontent.com/external_content/untrusted_dlcp/research.google.com/en//pubs/archive/34913.pdf>>, 30th IEEE Symposium on Security and Privacy, May 17-20, 2009, pp. 1-15.
Zeldovich, et al., "Making Information Flow Explicit in HiStar", Retrieved at <<https://db.usenix.org//events/osdi06/tech/full_papers/zeldovich/zeldovich.pdf>>, 7th Symposium on Operating Systems Design and Implementation (OSDI'06), Nov. 6-8, 2006, pp. 263-278.
"Supplementary Search Report Received for European Patent Application No. 12752531.9", dated Oct. 27, 2014, 9 Pages.
"Notice of Allowance Issued in Chinese Patent Application No. 201280011551.7", dated Aug. 24, 2016, 4 Pages.
"Office Action Issued in Japanese Patent Application No. 2013-556669", dated Mar. 9, 2016, 7 Pages.
"First Office Action Issued in Chinese Patent Application No. 201280011551.7", dated Jan. 26, 2016, 13 Pages.
"Office Action and Search Report Issued in Taiwan Patent Application No. 101112828", dated Nov. 13, 2015, 7 Pages.
"Notice of Allowance Issued in Japanese Patent Application No. 2013-556669", dated Sep. 2, 2016, 3 Pages.
Takahashi, Hidekazu, "Where is OS heading now", in book of the NIKKEI BYTE , Sep. 22, 2003, pp. 68-73.
"Office Action Issued in European Patent Application No. 12752531.9", dated Oct. 23, 2017, 7 Pages.

* cited by examiner

APPLICATION COMPATIBILITY WITH LIBRARY OPERATING SYSTEMS

CROSS-REFERENCE TO RELATED APPLICATIONS

This application claims the benefit of U.S. Provisional Application No. 61/449,072, filed Mar. 3, 2011, and entitled "LIBRARY-OPERATING-SYSTEM PACKAGING-MODEL SCENARIOS," and is incorporated in its entirety herein by reference.

BACKGROUND

A library approach to operating system (OS) construction was championed by several operating system designs in the 1990s. The idea of the library OS is that the entire personality of the OS on which an application depends runs in its address space as a library. An OS personality is the implementation of the OS's application programming interfaces (APIs) and application visible semantics—the OS services upon which applications are built. Early proponents of the library OS approach argued primarily that the library OS could enable better performance through per-application customization. For example, a disk-I/O bound application with idiosyncratic file access patterns can realize better performance by using a custom file-system storage stack rather than using the default sequential prefetching heuristics.

Like many of its contemporaries, the library OS approach is largely forgotten, a casualty of the rise of the modern virtual machines. While most new OS designs of the time, including library OS design, run only a handful of custom applications on small research prototypes, virtual machine systems proliferated because they could run major applications by reusing existing feature-rich operating systems. The performance benefits offered by library OS designs did not overcome the need for legacy compatibility.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to application compatibility with library operating systems. Applications can be bound to compatible library operating systems. A library operating system can encapsulate portions of an operating system most likely to break application compatibility and can run on top of a host operating system. Library operating systems can be of a version less than, equal to, or greater than a version of a host operating system. Accordingly, backward as well as forward compatibility is enabled by binding an application to an appropriate library operating system.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
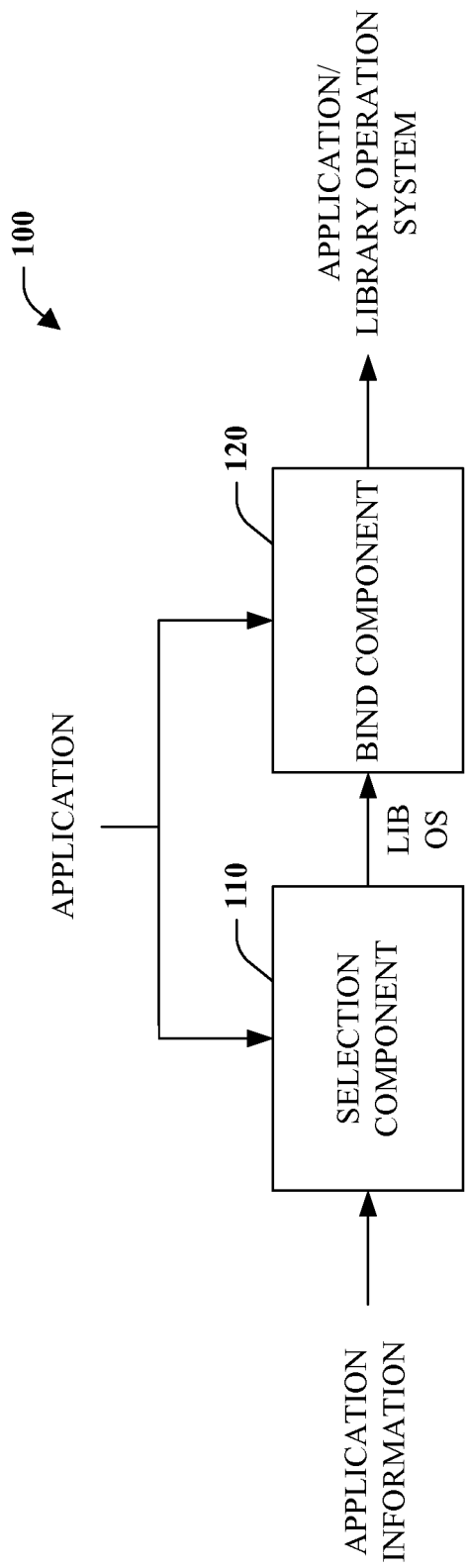
FIG. 1 is a block diagram of a system that facilitates application compatibility.

An operating system provides an interface between an application program, or simply an application, and computer hardware to enable the application to interact with the hardware. Applications are developed to target a specific operating system. However, operating systems change with various releases (e.g., Windows Vista®, Windows 7®, different service packs . . . ), and as a result maintaining compatibility with applications is a significant challenge. For example, if an application is developed for version one of an operation system and a computer is updated to version two, the application may no longer work or function in the correct manner. While operating system vendors expend significant resources maintaining compatibility, each operating system release inevitably results in a large number of broken applications. This is particularly onerous for enterprises where abundant and critical line-of-business (LOB) applications are broken by a new operating system release.

One way to address compatibility issues is to use virtual machine technology. Different operating systems can be run simultaneously in distinct virtual machines, and applications can execute in a compatible virtual machine. Here, applications are packaged with a specific full-featured operating system into a single unit and thus the application will always run on that packaged operating system regardless of the host operating system on which the virtual machine runs. Furthermore, there is severe performance and resource overhead of running an entirely separate copy of an operating system. In practice, a consumer device may only be able to run one or two virtual machines at a time, which makes it difficult to run many different applications.

Details below are generally directed toward application compatibility with library operating systems. Utilizing a library operating system the same benefits of virtual machine technology can be achieved but at a fraction of overhead and performance cost. Furthermore, an application need not be packaged with an operating system as conventionally done. Rather, an application can be packaged separate from an operating system even though a hard dependency on a particular operation system or version thereof exists. As a result, it is feasible to run various different applications on separate operating system version instances.

More specifically, an application can be bound to a compatible library operating system that encapsulates portions of an operating system most likely to break application compatibility. In one embodiment, a plurality of library operating systems can be packaged with a host operating system. Upon initiating execution of an application, a compatible library operating system can be bound to the application and loaded into the application's address space. The compatible library operating system can be of a version less than, equal to, or greater than the version of the host operating system. Consequently, backward compatibility (a.k.a. compatibility) with an earlier, or legacy, version of an operating system is enabled as well as forward compatibility (a.k.a. reverse compatibility) with later version of an operating system, among other things.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a system 100 that facilitates application compatibility is illustrated. The system 100 includes selection component 110 and bind component 120. The selection component 110 receives, retrieves, or otherwise obtains or acquires a software application, or simply an application, and/or information regarding the application, among other things. Moreover, the selection component 110 is configured to identify, determine, or infer a library operating system that is compatible with an application, for example based on the application and/or information regarding the application. The bind component 120 is configured to bind, or in other words associate, an application with the compatible library operating system identified by the selection component 110. In accordance with one aspect, functionality associated with at least the bind component 120 can be performed at runtime. For example, upon initiating execution of an application, the application can be bound dynamically with a compatible library operating system.

The selection component 110 can select a compatible library operating system in various manners. In one embodiment, an application can include, or be associated with, a manifest file or like structure that that identifies a compatible operating system and/or library operating system. In this instance, the selection component 110 can be configured to identify a compatible library operating system from the manifest file. In another embodiment, the application and associated functionality can be analyzed and based thereon a compatible library operating system can be determined or inferred. In yet another embodiment, the selection component 110 can be configured to query an application user, administrator, or other individual as to which library operating system is compatible with the application. In one particular instance, a plurality of library operating systems can be tried and a user can identify which library operating system worked best. Furthermore, a hybrid of approaches can be used such as inferring library operating system compatible with an application and allowing a user of the application to confirm or reject the inferred, compatible, library operating system. Further, an application can be compatible with more than one operating system or compatible to some degree. In any event, the select component 110 can identify one or more compatible library operating systems.

As noted above, the bind component 120 is configured to bind an application to a compatible library operating system. For example, from available library operating systems, a compatible library operating system is associated with an application. Subsequently, the library operating system can be loaded into the application's address space, for instance. Such loading can also be performed by the bind component 120 or some other component at runtime.

In accordance with one aspect, a library operating system can encapsulate portions of an operating system that are most likely to break application compatibility. Consequently, library operating systems provide a mechanism to resolve application compatibility problems. In particular, library operating systems can operate on top of a host operating system and be employed by applications, as needed. In some sense, each application can run with a library operating system of its choice thereby eliminating compatibility issues.

Such a library operating system can be generated by refactoring a conventional library operating system in a particular manner. More specifically, application services (e.g., frameworks, rendering engines, common user interface controls, language runtimes . . . ) can be packaged in a library operating system and user services (e.g., graphical user interface, clipboard, search indexers . . . ) and hardware services (e.g., OS kernel, device drivers, file systems . . . ) are packaged with a host operating system. In one instance, a library operating system can be produced that is $1/50^{th}$ the size of the full operating system. This library operating system is distinct from previous library operating systems designs, which aimed to provide application customized performance enhancement by exposing low-level hardware abstractions to applications. These previous designs provide applications with fine-grained, customized control of hardware resources such as page tables, network packets, and disk blocks. Here, the library operating system employed differs in its goal and thus offers higher-level abstractions that facilitate application compatibility, among other things.

Figure 2:
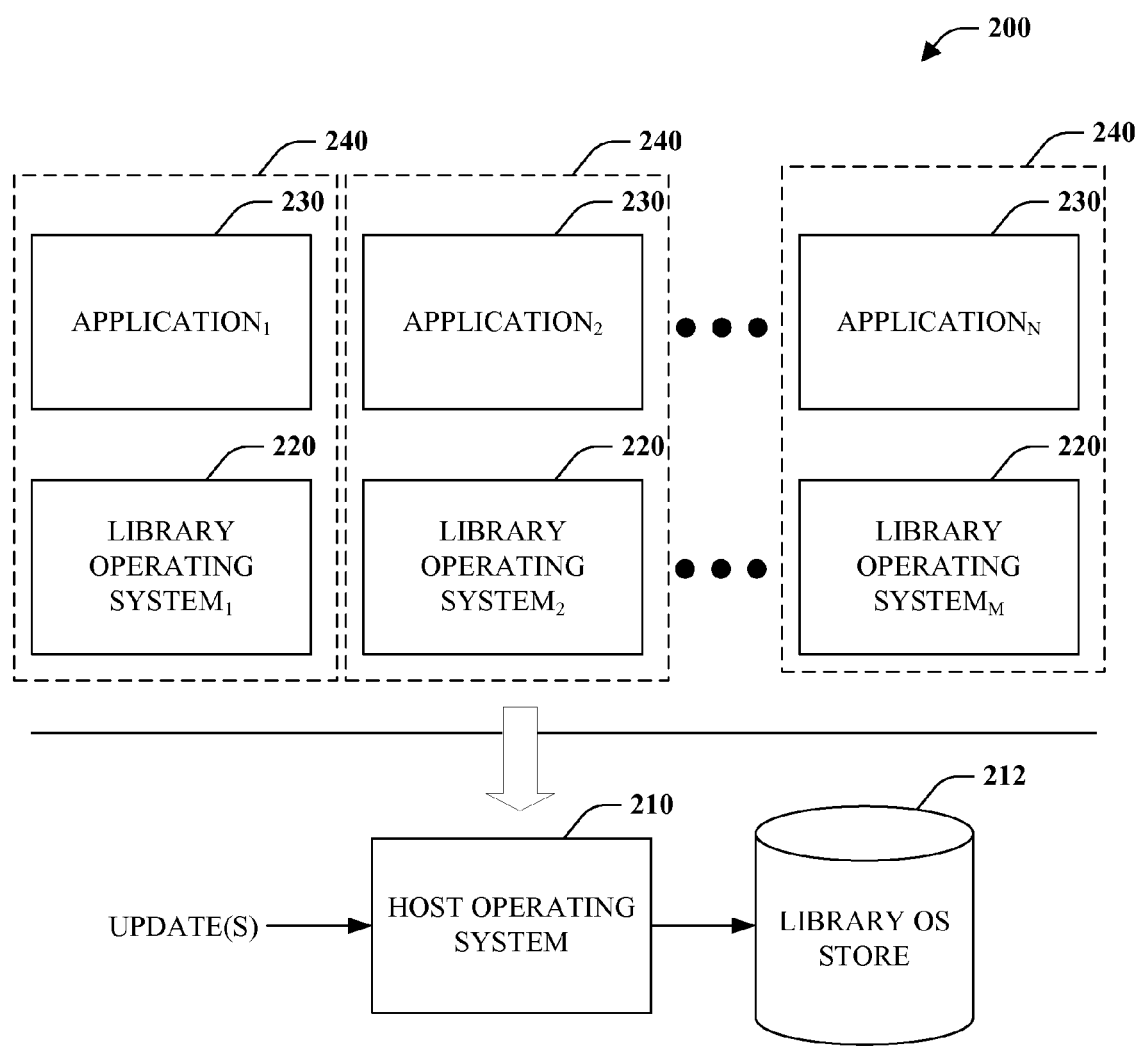
FIG. 2 is a block diagram of an exemplary library operating system architecture.

Turning attention to FIG. 2, an exemplary library-operating system architecture 200 is illustrated. As shown, the architecture 200 includes host operating system 210, which is the primary operating system installed on a computer. In most cases, the host operating system 210 is the only operating system. Here, however, several library operating systems 220 (LIBRARY OPERATING SYSTEM$_1$-LIBRARY OPERATING SYSTEM$_M$, where M is a positive integer) are guests that operate over, or within, the host operating system 210. A number of applications 230 (APPLICATION$_1$-APPLICATION$_N$, where N is a positive integer) are executed over compatible library operating systems 220. Each of the plurality of library operating systems 220 captures the personality (e.g., application programming interfaces and applications semantics, upon which applications are built) of an operating system on which an application depends and can run in the application's address space as a library. Accordingly, a library operating system can encapsulate portions of an operating system most likely to break application compatibility (e.g., application services).

The architecture 200 resembles a conventional virtual-machine architecture, but rather than employing an entire operating system, a library operating system is employed. Resource overhead is thus dramatically reduced. For example rather than consuming 512 MB of random access memory (RAM) and 5 GB of disk space to run an entirely separate copy of an operating system, less than 16 MB of RAM and 64 MB of disk space can be consumed by a library operating system. In practice, a typical consumer device may only be able to run one or two copies of entire conventional operating system, which makes it difficult to run many different applications. However, by substituting a library operating system of a conventional operating system many different applications requiring various versions of an operating system are supported quite easily.

The library operating systems 220 can be of a version that is less than, equal to, or greater than the version of the host operating system 210. Accordingly, backward and forward compatibility are enabled for applications utilizing library operating systems.

In accordance with one embodiment, the host operating system 210 can be packaged with one or more library operating systems 220. In other words, the host operating system 210 can include a collection of one or more library operating systems, for example within library operating system store 212. For example, library operating systems can be stored on disk in parallel directories with respect to a host operating system, among other things. An application can be bound to one of the library operating systems included with respect to the host operating system 210. Such an operating system can subsequently be loaded or duplicated into an application's address space. This addresses backward compatibility (a.k.a. compatibility) since the host operating system 210 can include at least a subset of previous, or legacy, library operating systems. For example, an application designed for a previous version of an operating system can run on the most recent version of the operation system by employing a library operating system packaged with the most recent version of the operating system. Forward compatibility (a.k.a. reverse compatibility) is also addressed.

In contrast to executing an application that was written for a previous version of an operating system on a more recent version of an operating system, an application written for a more recent operating system version can also be run on a previous version of an operating system. Typically, applications are tied to a particular version of a host operating system by way of application programming interfaces (APIs). Accordingly, developers face a dilemma as to whether to target a new host operating system when a significant portion of customers may not have upgraded to the new operating system. As a result, there is typically a lag around when developers adopt APIs that target a new operating system until an operating system gains enough users (commonly referred to as an installed base) to justify targeting the new operating system. By utilizing library operating systems, developers can target the latest operating system and run an application down a level, or, in other words, on a computer running an older version of an operating system. Because compatibility issues are in a library operating system, one can employ a library operating system with respect to a new version of the operating system and thus an application can target the most recent APIs. In one instance, a licensing fee can be charged to enable targeting of the latest operating system features in a newer library OS.

Furthermore, by allowing a host and an application to evolve separately, changes in the host operating system need not break applications. For example, suppose a host operating system is upgraded to a new version. At the time of upgrading, applications installed on the computer can be reconfigured to execute on a library operating system that matches the previous version of the operating system.

In accordance with one embodiment, each combination of an application 230 and a library operating system 220 can operate within a picoprocess 240, which is lightweight, secure isolation container built from an operating systems process address space but without access to the full services of a host operating system 210. In other words, applications can be sandboxed such that an ill-behaved application cannot compromise other applications or its host. Code running in the picoprocess can employ an interface with the host operating system 210 represented by the arrow in FIG. 2 following design patterns of hardware virtual machines. Interface calls can be serviced by a security monitor component (not shown) of the host operating system 210, which can be similar in function to a hypervisor or virtual machine monitor with respect to conventional hardware virtual machines.

Where library operating systems are packaged with host operating systems, for example in library operating system store 212, maintenance is facilitated. Mechanisms utilized to update the host operating system 210 can be exploited to update library operating systems packaged with the host operating system. For example, a library operating system can be patched for security updates and correctness fixes by the update facility in the host operating system 210. Further, by binding library operating systems to applications at runtime, the latest library operating system can be utilized rather than binding it to some other version thereof.

Additionally, mechanisms utilized to update the host operating system 210 can be exploited to install new library operating systems after the host operating system has shipped, or, in other words, has been delivered to customers. For instance, if upon service of a host operating system it is determined that a new version of a library operating system is available, the new library operating system can be acquired and saved.

Figure 3:
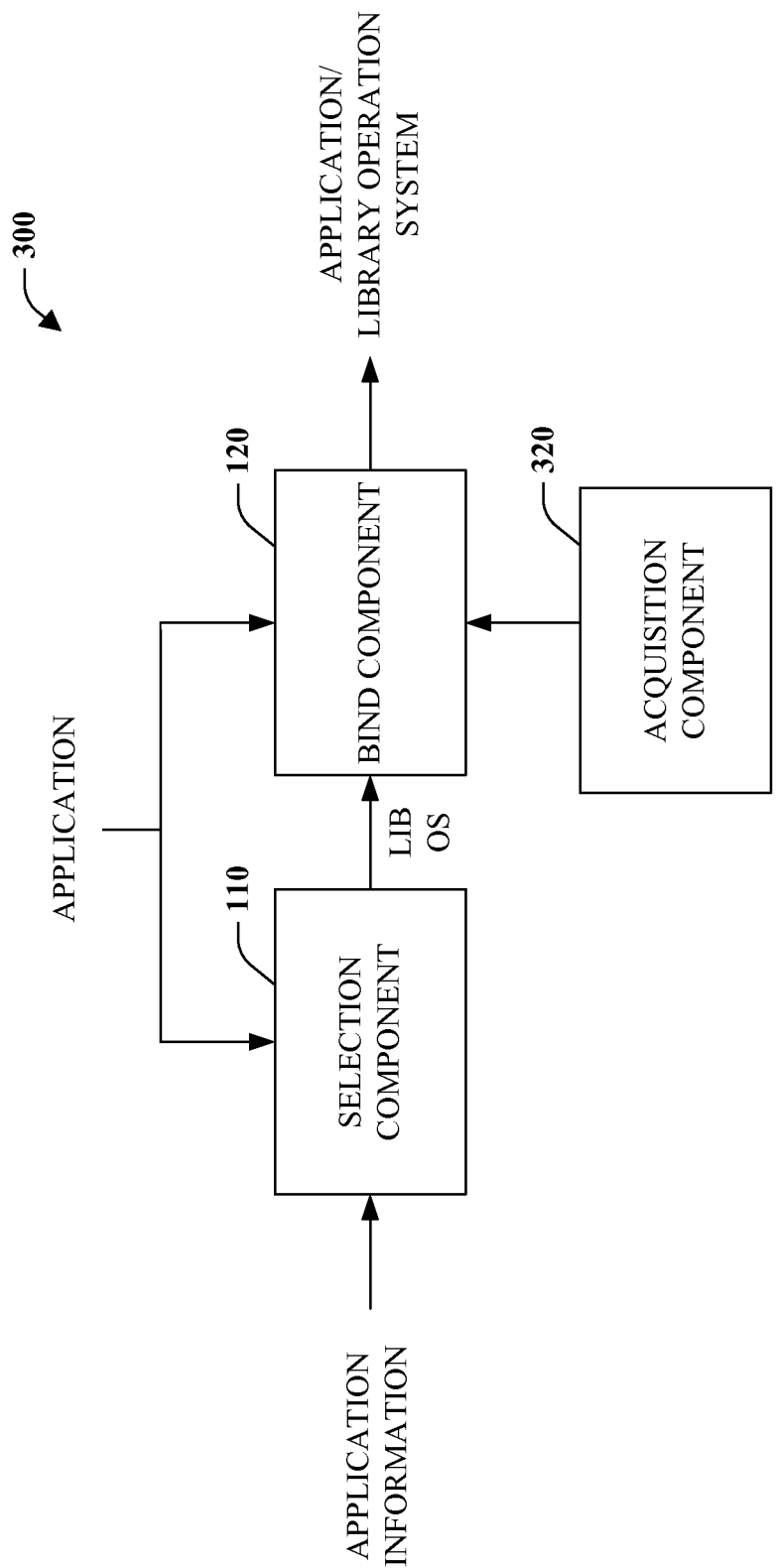
FIG. 3 is a block diagram of a system that facilitates application compatibility.

FIG. 3 illustrates a system 300 that facilitates application compatibility. Similar to system 100 of FIG. 1, system 300 includes the selection component 110 and the bind component 120, as previously described. In brief, the selection component 110 is configured to select or identify a library operating system that is compatible with the application, and the bind component 120 is configured to bind the application with the library operating system. Previously system 100 assumed local availability of a requisite library operating system for an application. However, in some instances that might not be the case. Acquisition component 320 addresses this issue. More particularly, the acquisition component 320 can be configured to acquire a library operating system, for instance from a publically or otherwise accessible website. In one particular instance, the acquisition component 320 can be configured to trigger a download of a library operating system by way of host operating system update mechanism. In sum, if the selection component 110 identifies a library operating system for an application that is not present on a system, the bind component 120 is configured to acquire the library operating system by way of the acquisition component 320.

Various library operating systems and a host operating system can coexist on a computer. As an example, consider one possible layout of library operating systems alongside a host operating system:
  C:\Windows\System32
  C:\Windows\SysWOW64
  C:\Windows\Windows.6.2.8102.Win8BUILD
  C:\Windows\Windows.6.1.7601.Win7SP1
  C:\Windows\Windows.6.1.7600.Win7®
  C:\Windows\Windows.6.0.6002.VistaSP2
  C:\Windows\Windows.6.0.6001.VistaSP1
  C:\Windows\Windows.6.0.6000.Vista®
  C:\Windows\Windows.5.1.2600.WinXPSP3

In this example, the "System32" directory tree contains a 64-bit host operating system. The directory tree "SysWOW64" contains 32-bit files of the host operating system that run on the 64-bit host operating system. The other directory trees include library operating systems from either earlier (Win7SP1, Win7®, VistaSP2, VistaSP1, Vista®, WinXPSP3) or later operating systems (Win8BUILD).

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the selection component 110 can employ such mechanism to determine a compatible library operating system.

Figure 4:
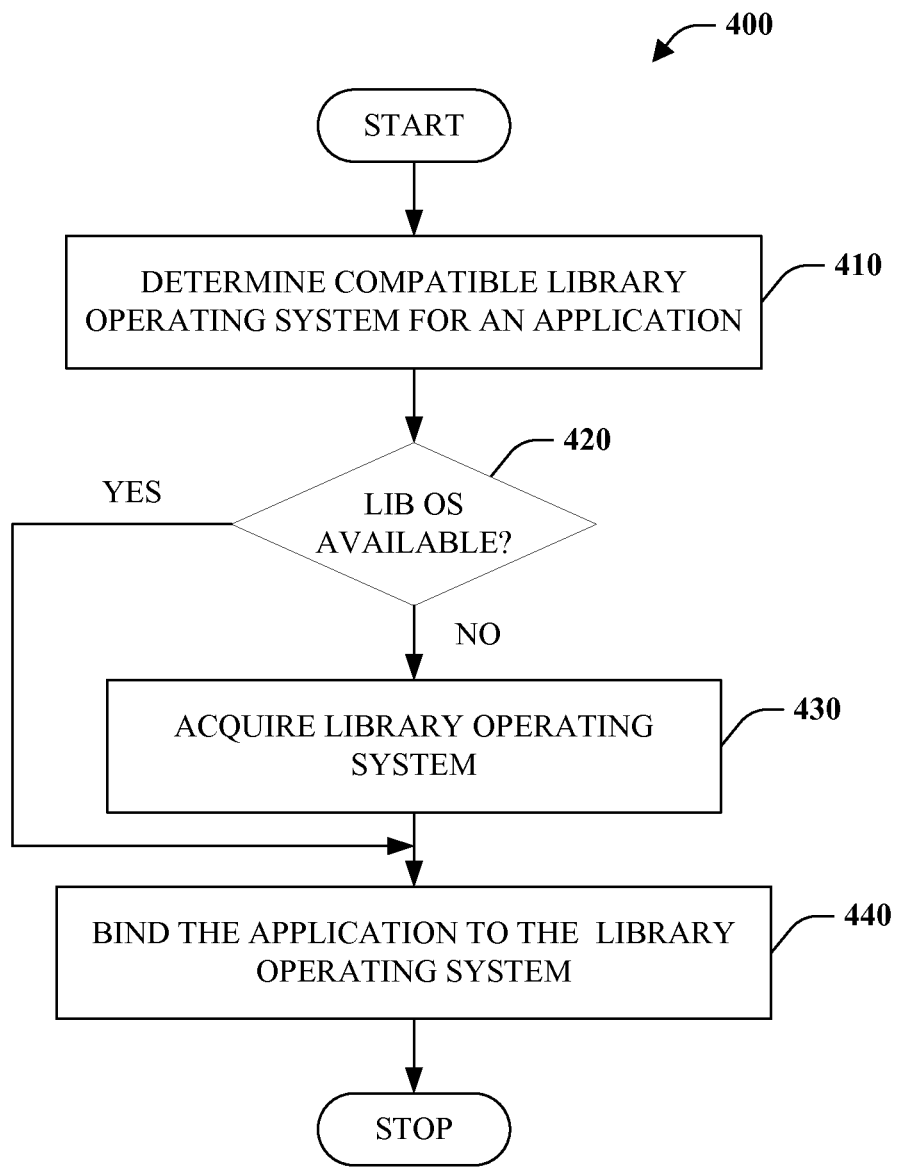
FIG. 4 is a flow chart diagram of a method of facilitating compatibility.

In view of the exemplary systems described supra, methodologies that may be implemented in accordance with the disclosed subject matter will be better appreciated with reference to the flow chart of FIG. 4. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 4, a method 400 of facilitating compatibility is illustrated. At reference numeral 410, a compatible library operating system for an application is determined, where library operating systems encapsulate portions of a conventional operating system most likely to break application compatibility. In one instance, the library operating system can be identified from manifest file associated with the application, acquired from an individual (e.g., end-user, programmer, administrator . . . ), or otherwise determined or inferred from analysis of the application. At numeral 420, a determination is made as to whether the determined library operating system is available. If the library system is not available locally on a computer ("NO"), the library operating system is acquired from a remote location at 430. Otherwise, if the library operating system is available ("YES"), the method 400 continues at reference numeral 440 where the application is bound to the library operating system. Although not shown here where an application is compatible with multiple operating systems rather than remotely acquiring a library operating system one of the other local library operating systems can be employed. Upon initiating execution of the application, the bound library system can be loaded into the application's address space.

Figure 5:
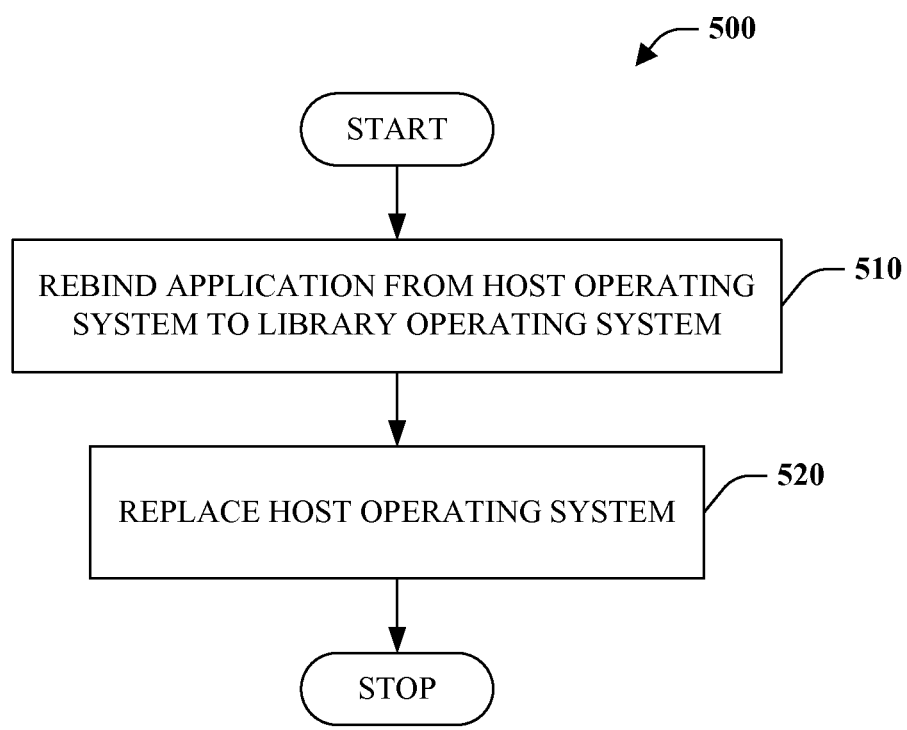
FIG. 5 is a flow chart diagram of a method of host operating system replacement.

FIG. 5 is a flow chart diagram of a method 500 of host operating system replacement. At reference numeral 510, an application is rebound from a host operating system to the same version of a library operating system. At numeral 520, the host operating system is replaced. In this manner, a host operating system can be upgraded/updated without breaking applications by shifting applications to a compatible library operating system.

As used herein, the terms "component," "system," "architecture," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'A' and 'B,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
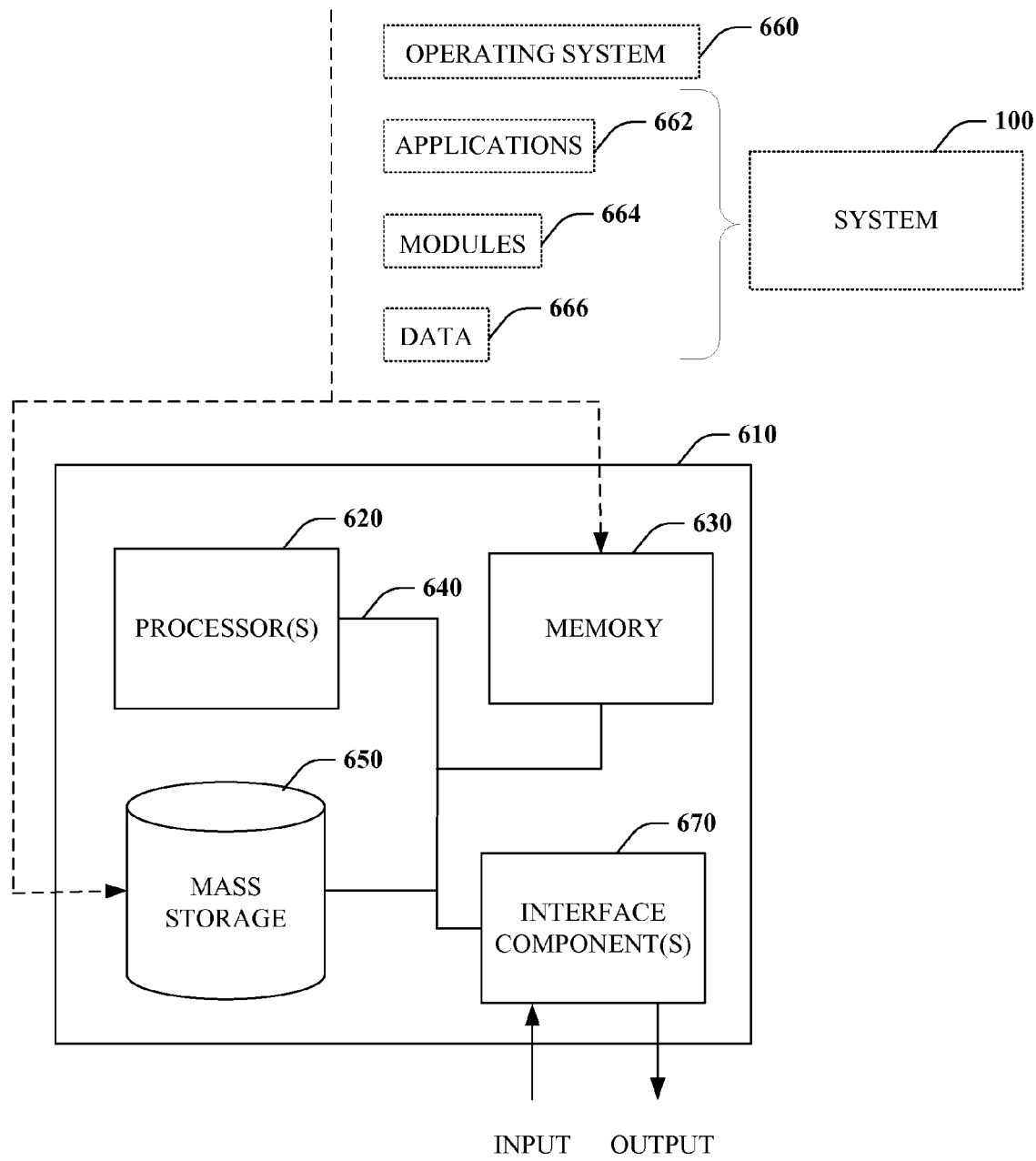
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 6, illustrated is an example general-purpose computer 610 or computing device (e.g., desktop, laptop, server, hand-held, programmable consumer or industrial electronics, set-top box, game system . . . ). The computer 610 includes one or more processor(s) 620, memory 630, system bus 640, mass storage 650, and one or more interface components 670. The system bus 640 communicatively couples at least the above system components. However, it is to be appreciated that in its simplest form the computer 610 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration.

The computer 610 can include or otherwise interact with a variety of computer-readable media to facilitate control of the computer 610 to implement one or more aspects of the claimed subject matter. The computer-readable media can be any available media that can be accessed by the computer 610 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 610.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 630 and mass storage 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 610, such as during start-up, can be stored in nonvolatile memory, while volatile memory can act as external cache memory to facilitate processing by the processor(s) 620, among other things.

Mass storage 650 includes removable/non-removable, volatile/non-volatile computer storage media for storage of large amounts of data relative to the memory 630. For example, mass storage 650 includes, but is not limited to, one or more devices such as a magnetic or optical disk drive, floppy disk drive, flash memory, solid-state drive, or memory stick.

Memory 630 and mass storage 650 can include, or have stored therein, operating system 660, one or more applications 662, one or more program modules 664, and data 666. The operating system 660 acts to control and allocate resources of the computer 610. Here, the operating system 660 can correspond to a host operating system 210 able to support a number of library operating systems 220. Applications 662 include one or both of system and application software and can exploit management of resources by the operating system 660 through program modules 664 and data 666 stored in memory 630 and/or mass storage 650 to perform one or more actions. Accordingly, applications 662 can turn a general-purpose computer 610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100, or portions thereof, can be, or form part, of an application 662, and include one or more modules 664 and data 666 stored in memory and/or mass storage 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, system 100 and/or associated functionality can be embedded within hardware in a SOC architecture.

The computer 610 also includes one or more interface components 670 that are communicatively coupled to the system bus 640 and facilitate interaction with the computer 610. By way of example, the interface component 670 can be a port (e.g., serial, parallel, PCMCIA, USB, FireWire . . . ) or an interface card (e.g., sound, video . . . ) or the like. In one example implementation, the interface component 670 can be embodied as a user input/output interface to enable a user to enter commands and information into the computer 610 through one or more input devices (e.g., pointing device such as a mouse, trackball, stylus, touch pad, keyboard, microphone, joystick, game pad, satellite dish, scanner, camera, other computer . . . ). In another example implementation, the interface component 670 can be embodied as an output peripheral interface to supply output to displays (e.g., CRT, LCD, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method that facilitates compatibility, comprising:
   employing at least one processor configured to execute computer-executable instructions stored in memory to perform the following acts:
   identifying, at a runtime of an application, a library operating system that is compatible with the application, wherein the identified library operating system consists of application services executable in an isolation container, and wherein the identified library operating system is configured to communicate with operating-system hardware services and user services of a host operating system;
   locating the identified library operating system; and
   in response to the identifying of the library operating system, binding the application to the identified library operating system.

2. The method of claim 1, wherein the identifying of the library operating system includes:
   identifying the library operating system from a manifest file.

3. The method of claim 1, wherein the identifying of the library operating system includes:
   identifying multiple library operating systems from a manifest file.

4. The method of claim 1, wherein the library operating system is of a more recent version than the host operating system.

5. The method of claim 1, wherein the acts further comprise:
   loading the identified library operating system from the host operating system.

6. The method of claim 1, wherein the acts further comprise:
   acquiring the identified library operating system as part of an update process for the host operating system.

7. The method of claim 1, wherein the acts further comprise:
   updating the identified library operating system as part of an update process for the host operating system.

8. The method of claim 1, wherein the acts further comprise:
   replacing a first version of the host operating system with a second version of the host operating system; and
   binding the application to the library operating system corresponding to the first version of the host operating system.

9. The method of claim 1, wherein the locating of the identified library operating system includes:
   locating a most recent version of the identified library operating system.

10. A computing device, comprising:
    a memory and a processor, wherein the memory and the processor are respectively configured to store and execute instructions, including instructions for causing the computer to perform the following operations:
    identifying, at a runtime of an application, a library operating system that is compatible with the application, wherein the identified library operating system consists of application services executable in an isolation container, and wherein the identified library operating system is configured to communicate with operating-system hardware services and user services of a host operating system; and
    in response to the identifying of the library operating system, binding the application to the identified library operating system.

11. The computing device of claim 10, wherein the identified library operating system is packaged with the host operating system.

12. The computing device of claim 10, wherein the identified library operating system is a more recent version of the host operating system.

13. The computing device of claim 10, wherein the identified library operating system is an older version of the host operating system.

14. The computing device of claim 10, wherein the operations also include:
    locating the identified library operating system based on information from a manifest file.

15. The computing device of claim 10, wherein the operations also include:

updating the identified library operating system as part of an update process for the host operating system.

16. The computing device of claim 10, wherein the operations also include:

acquiring the identified library operating system as part of an update process for the host operating system.

17. A computer-readable storage medium, having instructions stored thereon, that in response to execution, cause a computing device to perform operations, the operations comprising:

identifying, at a runtime of an application, a library operating system that is compatible with the application, wherein the identified library operating system consists of application services executable in an isolation container, and the identified library operating system is configured to communicate with operating-system hardware services and user services of a host operating system;

locating the identified library operating system; and in response to the identifying of the library operating system, binding the application with the identified library operating system.

18. The computer-readable storage medium of claim 17, wherein the operations further comprise:

identifying the identified library operating system based on information from a manifest file.

19. The computer-readable storage medium of claim 17, wherein the operations further comprise:

identifying a new version of the host operating system as the identified library operating system.

20. The computer-readable storage medium of claim 17, wherein the operations further comprise:

identifying a legacy version of the host operating system as the identified library operating system.

* * * * *